United States Patent
Grattard et al.

(10) Patent No.: US 8,509,967 B2
(45) Date of Patent: Aug. 13, 2013

(54) SYSTEM AND METHOD FOR CALCULATING FLIGHT PREDICTIONS BY VERTICAL SECTIONS

(75) Inventors: Alexandre Grattard, Plaisance du Touch (FR); Nicolas Simi, Lavernose-Lacasse (FR); Alex Bourdon, Toulouse (FR)

(73) Assignee: Thales, Neuilly-sur-Seine (FR)

( * ) Notice: Subject to any disclaimer, the term of this patent is extended or adjusted under 35 U.S.C. 154(b) by 386 days.

(21) Appl. No.: 12/548,071

(22) Filed: Aug. 26, 2009

(65) Prior Publication Data

US 2010/0082185 A1 Apr. 1, 2010

(30) Foreign Application Priority Data

Aug. 29, 2008 (FR) ..................... 08 04765

(51) Int. Cl.
*G05D 1/00* (2006.01)
(52) U.S. Cl.
USPC ............. 701/3; 701/120; 701/121; 701/99; 340/961; 340/971; 340/974; 340/978
(58) Field of Classification Search
USPC ................... 701/4, 14, 3; 340/945
See application file for complete search history.

(56) References Cited

U.S. PATENT DOCUMENTS

| 5,606,505 | A | * | 2/1997 | Smith et al. ............ 701/99 |
| 6,163,743 | A | * | 12/2000 | Bomans et al. .......... 701/3 |
| 6,181,987 | B1 | * | 1/2001 | Deker et al. ............ 701/3 |
| 6,507,782 | B1 | * | 1/2003 | Rumbo et al. ........... 701/121 |
| 6,571,155 | B2 | * | 5/2003 | Carriker et al. ......... 701/3 |
| 6,995,690 | B1 | * | 2/2006 | Chen et al. ............. 340/974 |
| 7,177,731 | B2 | * | 2/2007 | Sandell et al. .......... 701/3 |
| 7,366,591 | B2 | * | 4/2008 | Hartmann et al. ........ 701/4 |
| 7,561,946 | B1 | * | 7/2009 | Schipper ............... 701/8 |
| 7,777,647 | B2 | * | 8/2010 | Sallier et al. .......... 340/978 |
| 7,835,825 | B2 | * | 11/2010 | Coulmeau et al. ........ 701/3 |
| 7,852,236 | B2 | * | 12/2010 | Feyereisen et al. ...... 340/971 |
| 7,904,213 | B2 | * | 3/2011 | Coulmeau ............... 701/3 |
| 2003/0193410 | A1 | * | 10/2003 | Chen et al. ............. 340/971 |
| 2003/0222887 | A1 | * | 12/2003 | Wilkins et al. .......... 345/618 |
| 2005/0049762 | A1 | * | 3/2005 | Dwyer ................... 701/3 |
| 2005/0091036 | A1 | * | 4/2005 | Shackleton et al. ...... 704/9 |
| 2006/0250280 | A1 | * | 11/2006 | Chen et al. ............. 340/974 |
| 2007/0219678 | A1 | * | 9/2007 | Coulmeau ............... 701/3 |
| 2008/0097658 | A1 | * | 4/2008 | Shue et al. ............. 701/8 |

(Continued)

FOREIGN PATENT DOCUMENTS

| EP | 0 826 846 A1 | 3/1998 |
| FR | 2 744 525 A1 | 8/1997 |
| FR | 2 898 673 A1 | 9/2007 |

*Primary Examiner* — Thomas Black
*Assistant Examiner* — Wae Louie
(74) *Attorney, Agent, or Firm* — Baker & Hostetler LLP

(57) ABSTRACT

The invention relates to a system and a method for calculating flight predictions of an aircraft in which an intermediate prediction horizon is defined between the flight phase and the leg. This horizon, that is called vertical section, is defined such that the limit conditions that are applicable to it, for example the target speed, target altitude, characteristic altitude and maximum end-of-section distance, are valid for the entire vertical section. Thus, it is not necessary, in calculations to check the compatibility of the flight parameters with the applicable constraints, to arbitrarily select the constraint that must be given priority. Furthermore, this intermediate level architecture allows for a greater modularity of the prediction management software and therefore a greater factorization of the developments and greater ease of maintenance.

10 Claims, 11 Drawing Sheets

(56) References Cited

U.S. PATENT DOCUMENTS

2009/0112535 A1* 4/2009 Phillips .......................... 703/2
2010/0076629 A1* 3/2010 Chaix et al. .................. 701/14
2010/0082185 A1* 4/2010 Grattard et al. ................. 701/3
2010/0217510 A1* 8/2010 Deker ......................... 701/120
2011/0077858 A1* 3/2011 Coulmeau et al. ........... 701/204
2011/0077859 A1* 3/2011 Coulmeau et al. ........... 701/204

* cited by examiner

SYSTEM AND METHOD FOR CALCULATING FLIGHT PREDICTIONS BY VERTICAL SECTIONS

CROSS-REFERENCE TO RELATED APPLICATIONS

This application claims priority of French application no. FR 0804765, filed Aug. 29, 2008, the disclosure of which is hereby incorporated by reference in its entirety.

FIELD OF THE INVENTION

The present invention belongs to the field of onboard flight management systems (FMS) on aircraft. More specifically, it applies to the flight prediction module (PRED) which, for a horizontal trajectory of the aircraft linking the characteristic points (waypoints) of a flight plan (FPLN), calculates the vertical trajectory that the aircraft must follow.

BACKGROUND OF THE INVENTION

This calculation is normally carried out for each flight phase (climb, cruising, descent) by resolving the numerous constraints that limit the speed, the acceleration or the altitude that are possible for the aeroplane and by setting as an objective the flight parameters to be reached at the end of the phase. In particular, when there are numerous waypoints, it is impossible to use an algorithm running in real time to determine the order in which the constraints must be applied. This order must therefore be selected arbitrarily, which necessarily leads to errors. On the other hand, it is not possible to systematically limit the prediction horizon to a flight leg, since one of the objectives of the calculations is to determine the appropriate transitions for passing from one leg to another taking into account the characteristics of the subsequent legs.

SUMMARY OF THE INVENTION

The present invention resolves this problem by providing, between the phase and the leg, a horizon for calculating the predictions that can be used to resolve the constraints easily in real time.

To this end, the invention discloses a system for calculating flight predictions of an aircraft comprising a module for calculating predictions by flight phase and a module for calculating predictions by flight leg, and further comprising a module for calculating predictions by vertical section, a section being contained in a phase and comprising at least one leg, said vertical section being defined by limit conditions that remain valid as long as the aircraft is travelling along said section.

Advantageously, said limit conditions comprise parameters selected from the group comprising target speed, target altitude, characteristic altitude and minimum end distance.

Advantageously, the target speed is the minimum of the values of a group comprising the active speed constraint, the optimum climb speed and, if the predicted altitude of the aircraft is less than the altitude corresponding to the climb limit speed, said climb limit speed, said target speed being in any case less than a prescribed limit speed if the vertical section is a holding pattern or a deceleration zone.

Advantageously, at least some of the limit conditions of a vertical section of a climb phase are defined, if there is an altitude constraint of the type value equal to, value less than or range of values, by an upper altitude boundary equal to the minimum of said upper boundary and of said altitude constraint, and if there is an altitude constraint of the type value equal to, value greater than or range of values, by a lower boundary equal to said altitude constraint.

Advantageously, if the vertical section is neither a holding pattern nor a deceleration zone of a vertical section comprising a leg HM, if an upper altitude boundary is defined, then the target altitude is the lower boundary, otherwise the target altitude is the cruising altitude.

Advantageously, if the vertical section is a holding turn or a deceleration zone of a vertical section comprising a leg HM, if an upper altitude boundary is defined, then the target altitude is said upper boundary, otherwise the target altitude is the cruising altitude, under the constraint that said target altitude must be higher than a prescribed minimum altitude.

Advantageously, the module for calculating a vertical section also calculates conditions applicable to said section chosen from the group comprising a cross-over altitude, a minimum distance to destination at the end of the section, a wind cell and a temperature cell.

Advantageously, the module for calculating a phase calculates a type for the next vertical section.

Advantageously, a type of vertical section applicable to a hold can be broken down into at least two sections, one a deceleration zone and the other a holding pattern.

The invention also discloses a method of calculating flight predictions of an aircraft comprising a step for calculating predictions by flight phase and a step for calculating predictions by flight leg, and further comprising a step for calculating predictions by vertical section, a section being contained in a phase and comprising at least one leg, said vertical section being defined by limit conditions that remain valid as long as the aircraft is travelling along said section.

The invention also offers the advantage of facilitating the breaking down of the issues and responsibilities at the software specification and development level. Furthermore, the calculation architecture is thus more modular with the possibility of adding methods for resolving new constraints without modifying the architecture. Thus, the perfective maintenance capabilities of the application are greatly enhanced.

BRIEF DESCRIPTION OF THE DRAWINGS

The invention will be better understood, and its various characteristics and benefits will become apparent from the following description of a number of exemplary embodiments and its appended figures in which.

DETAILED DESCRIPTION

Unless stated otherwise, in the description and the figures, the symbols, acronyms and abbreviations have the meanings indicated in the table below.

| Symbol/abbreviation | Meaning |
| --- | --- |
| AFDX | Avionics Full DupleX switched Ethernet |
| AMS | Avionics Management System |
| APP | Approach |
| ARINC | Aeronautical Radio, Inc. |
| CAS | Calibrated Air Speed |
| CLB | Climb |
| CRZ | Cruise |
| DES | Descent |
| DME | Distance Measuring Equipment |
| ENV | UML representation of the external environment |
| FIX | Waypoint or characteristic fixed point in a flight plan |
| FMS | Flight Management System |
| FPLN | Flight Plan |
| GNSS | Global Navigation Satellite System |
| HA | Hold to Altitude |
| HF | Hold to Fix |
| HM | Holding Manual leg |
| HOLD/Hx | Holding pattern |
| ICAO/OACI | International Civil Aviation Authority |
| IMA | Integrated Modular Avionics |
| KTS | Knots - Unit of speed: one knot = 1 nautical mile per hour = 1.852 km/h |
| MEA | Minimum Altitude in flight or in Route |
| MOCA | Minimum Obstacle Clearance Altitude |
| NM | Nautical Miles (1 NM = 1.856 km) |
| PI | Procedure Turn |
| PRED | Prediction |
| TLTO | Tactical Landing Take-Off |
| TO | Take-Off |
| TRA | Thrust Reduction Altitude |
| TRAJ | Trajectory |
| UML | Unified Modeling Language |
| VMAXENDURANCE | Maximum endurance speed |
| $V_2$ | Takeoff safety speed |
| xA | Any leg to Altitude |
| XovA | Cross Over Altitude |

Figure 1:
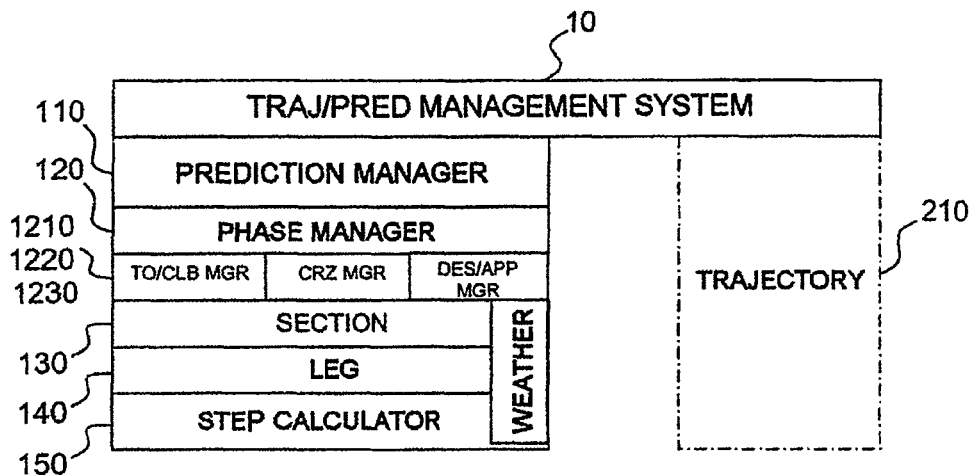
FIG. 1 represents the functional architecture of a trajectory/prediction manager.

FIG. 1 represents the functional architecture of a trajectory/prediction management system, TRAJ/PRED 10. An FMS is in particular tasked with calculating the vertical trajectory predictions of the aeroplane which comply with all the constraints linked to its flight plan, to the flight domain of the aeroplane, to the applicable regulations and to passenger comfort. In an FMS, the FPLN (flight plan) subsystem, which determines the route between a starting point and a destination point, occupies the top functional level. A navigation database contains the coordinates of the characteristic points on the route (waypoints) that may possibly be DME beacons. The FPLN takes into account the flight parameters of the aeroplane, such as cruising speed and altitude, flying time and consumption objectives and weather conditions predicted in flight. The aeroplane is permanently located, more often than not by using the readings from a GNSS receiver, possibly hybridized with inertial sensor and/or baroaltimetric measurements. To generate guidance instructions to be transferred to the automatic pilot system to control flight commands so as to reach a position in the FPLN from the current position of the aeroplane, it is necessary to generate a three-dimensional trajectory that links these two positions. In practice, the FMS generates two projections of the 3D trajectory, one in the horizontal plane, the other in the vertical plane. It is the trajectory/prediction management subsystem TRAJ/PRED that is tasked with generating these projections. By convention, the term "trajectory" (TRAJ) is used to mean the horizontal projection and the term "prediction" (PRED) is used to mean the vertical projection. It will be noted that an FMS can manage a number of FPLNs in parallel: the active plan, an alternative plan, an emergency flight plan should an alert be triggered including a diversion procedure.

The TRAJ/PRED management system 10 includes internal loops. It schedules the calculation calls from the module TRAJ 210 and PRED and the iterative loops for updating the complete trajectory following the calculation of the predictions on a given leg xA. This invention relates only to the PRED part relating to the generation of the vertical projection of the trajectory of the flight plan. A prediction manager 110 manages the various flight plan instantiations (active, alternative, TLTO). The calculations of the predictions are organized by flight phase by the phase manager 120. Three phase types are usually used: a takeoff/climb type (TO/CLB MGR, 1210), a cruise type (CRZ, 1220) and a descent/approach type (DES/APP, 1230). The phase manager schedules the calculations according to the different phases (e.g.: it sequences a climb calculation, a descent calculation and, if necessary, a cruise calculation CRZ; then, it may decide to iterate on the descent calculation for convergence to the T/D (top of descent), between descent and cruising or climb). The TO/CLB, CRZ, DES/APP managers each manage a single flight phase (e.g.: cruising with its STEPs).

In a traditional architecture, the manager of a phase schedules the prediction calculations by "leg", a leg linking two waypoints, and within each leg, by "step", each step being characterized within one and the same leg, by the application of a single propagation model, downloaded from a database to apply a step calculation algorithm (for example: set level, maximum climb/descent, imposed vertical speed, imposed climb/descent angle, all these while accelerating/decelerating or being at constant speed). In a system from the prior art of this type, the high level layers for calculating vertical predictions determine a priori the constraining elements (in altitude and speed), on the basis of an estimation of the capacities of the aeroplane to sustain these constraints (in climb/descent and/or in acceleration/deceleration). In case of an error in these estimations, an error being inevitable, the results are adjusted a posteriori by linear interpolation in order to obtain the aeroplane status at a given point. The difficulty in calculating the predictions is, among other things, associated with the possibility of multiplication of the constraints applicable at a given point. It is often difficult, on the first iteration, to determine a priori and without approximation which of these multiple constraints is truly constraining for the aeroplane, since this characteristic will essentially depend on the flight performance characteristics of the aeroplane. Furthermore, the list of the constraints, to be taken into account in calculating the predictions, varies according to numerous parameters such as the flight phase, the leg type or the vertical mode engaged by the aeroplane. By way of example, in a case where the aeroplane is travelling at managed speed along an HM leg in the climb phase, the FMS must predict the trend of the current aeroplane status in the HM leg following compliance with the following constraints:

speed constraint, taking into account the speed constraints defined in climb mode, the ICAO speed limits associated with the holding patterns, the speed limitation associated with the terminal procedures (climb speed limit), the holding speed (maximum endurance speed) and the speed envelope (Vmin and Vmax);

altitude constraint, taking into account the altitude constraints defined in climb mode and the cruising altitude.

According to the invention, a vertical section manager is inserted between the manager of a phase and the manager of a leg.

The section is defined as a "zone" limited by a distance boundary, along the trajectory, and an altitude boundary for which the applicable conditions and the end conditions are defined previously and valid for the entire section. The introduction of the vertical section enables the low level layers of the application, via the provision of a set of potentially constraining conditions, to exit accurately and deterministically upon the first constraint actually reached in the propagation of the aeroplane status. It is therefore no longer necessary to determine a priori the order of these constraints. Thanks to the introduction of this additional level into the architecture, the low level layers (propagation algorithms) thus become generic since they become independent of the high level layers that call them. These high level layers are then differentiated by the way in which the list of potentially constraining conditions which are applicable to the vertical section is determined. It is also possible to aggregate these vertical sections into sets called supersections, within which a certain number of particular processing operations, dependent on one another, can be carried out. As indicated later in the description, these supersections facilitate, for example, the calculation of the predictions on HOLDs.

Figure 2:
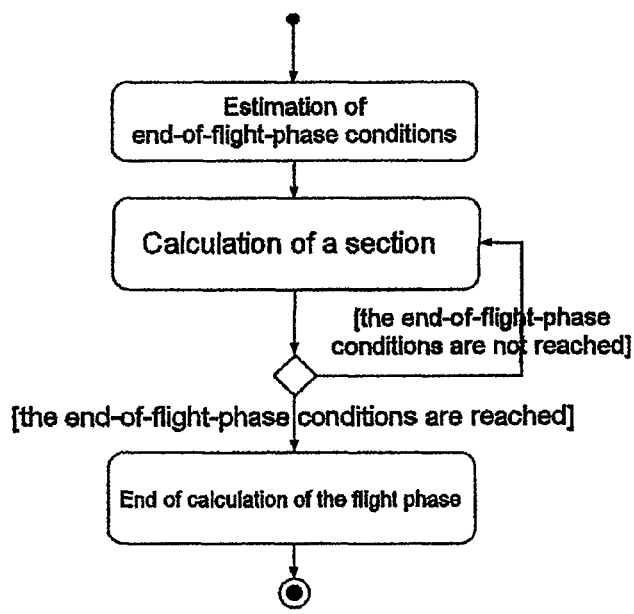
FIG. 2 represents the general flow diagram of the calculations of a flight phase according to an embodiment of the invention.

FIG. 2 represents the general flow diagram of the calculations of a flight phase according to an embodiment of the invention. A flight phase is therefore defined in the architecture of a prediction calculation system according to the invention as a sequence of vertical sections. The calculation logic consists in determining the end-of-flight-phase conditions, for example a characteristic altitude, then in calculating the sections that make up the phase, by checking at the end of each section whether the end-of-phase conditions are reached, by going onto the next phase if they are and by calculating the next section if they are not. The calculation of a section begins with the determination of its type.

Figure 3:
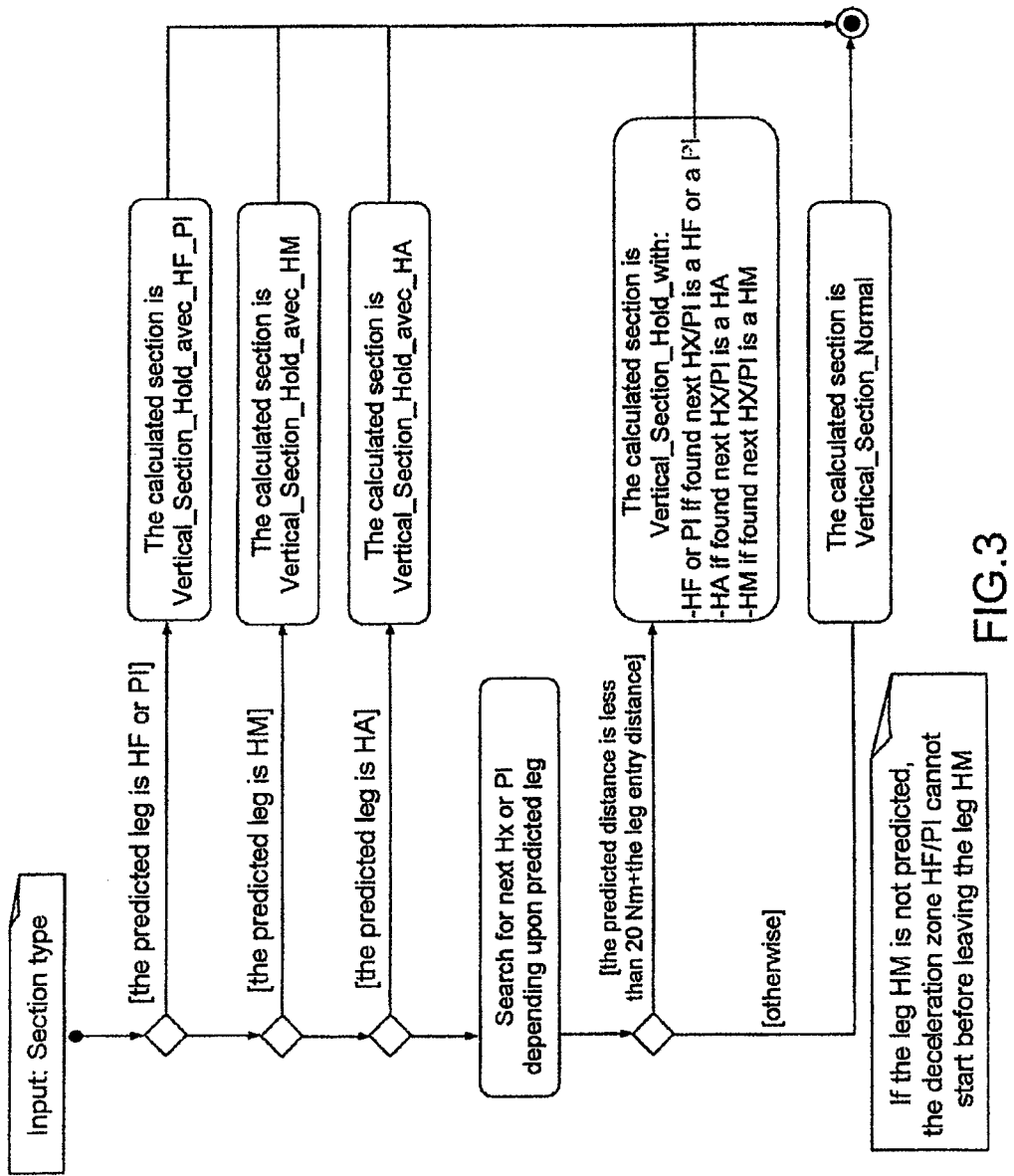
FIG. 3 represents the flow diagram of the calculation to determine the type of a vertical section according to an embodiment of the invention.

FIG. 3 represents the flow diagram of the calculation to determine the type of a vertical section according to an embodiment of the invention. This calculation is illustrated by the example of a vertical section in a climb phase. The determination of the type of section is based on the prediction of the leg and the position of a deceleration point to uphold the imposed speed limits in a leg with a hold. If the predicted leg is characteristic of a HOLD, the type of the vertical section will be that of a HOLD supersection. The characteristic legs of a HOLD, in the ARINC 424 nomenclature, are the following four legs:

HA: holding pattern to altitude, in which the definition of the leg is given by an altitude constraint;

HF: holding pattern to fix, in which the definition of the leg is given by reference to a waypoint;

HM: holding pattern manual, in which the leg is managed manually;

PI: procedure turn, which is a HOLD-specific turn.

An additional condition to know which section of the supersection the aeroplane is in is the predicted distance, the HOLD procedures defined by the aircraft manufacturer or the operator normally providing for a 20 NM deceleration before the HOLD itself. Other types of supersections can be filtered by the predicted leg type or by another analysis of other applicable conditions. Once the section type is determined, the calculations specific to the vertical section can be carried out.

Figure 4:
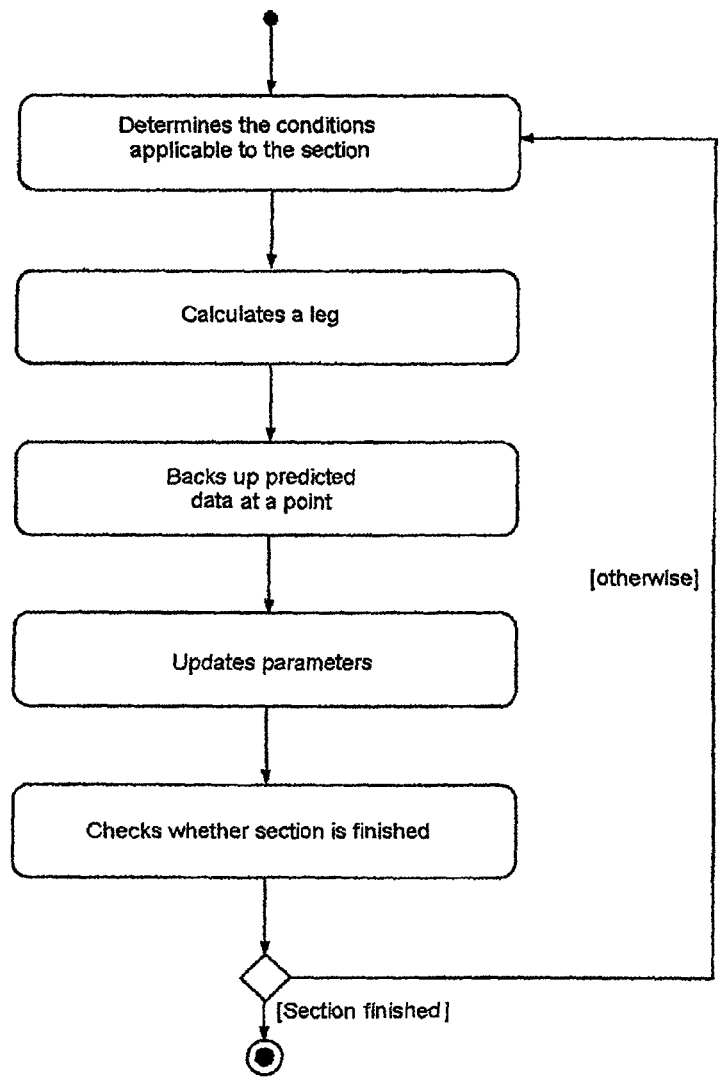
FIG. 4 represents the general flow diagram of the calculations of a vertical section according to an embodiment of the invention.

FIG. 4 represents the general flow diagram of the calculations of a vertical section according to an embodiment of the invention. Two types of conditions are defined for a section: the limit conditions and the other applicable conditions that use associated calculations. The calculation of a section begins with the calculation of the limit conditions or end conditions, described in relation to FIG. 5. Then, the various other conditions applicable to the section are determined. This calculation will be described in relation to FIG. 6. These conditions are normally reassessed on each change of section. It is, however, possible to decide to carry out only some of the recalculations to optimize the processing operations. Once the conditions applicable at the limits and during the section have been determined, the calculation of the legs is initiated, each leg calculation being scheduled by the section and comprising, as in the prior art, one or more calculations per step, each step being characterized by the selection of a suitable propagation formula. On leaving the leg calculation, the predicted data at each of the points are backed up by the system, the parameters are updated and a check is carried out to see if the calculation of the vertical section is finished. If it is, the system goes on to the next section, otherwise, the calculation is iterated on the next leg of the section. As previously indicated, if there is a supersection, the section is replaced with a supersection that handles the scheduling of the sections (for example three in the case of a HOLD-type supersection), each section handling the scheduling of its component steps.

Figure 5:
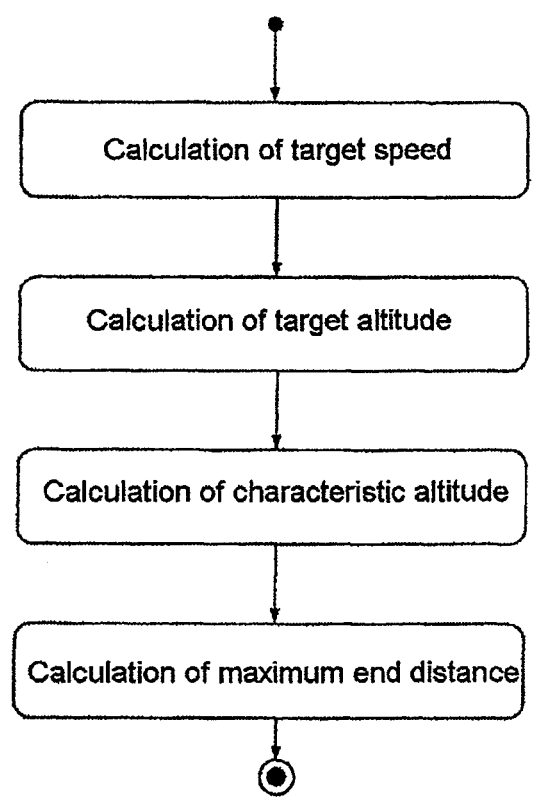
FIG. 5 represents the flow diagram of the calculations of the end conditions of a vertical section according to an embodiment of the invention.
Figure 9:
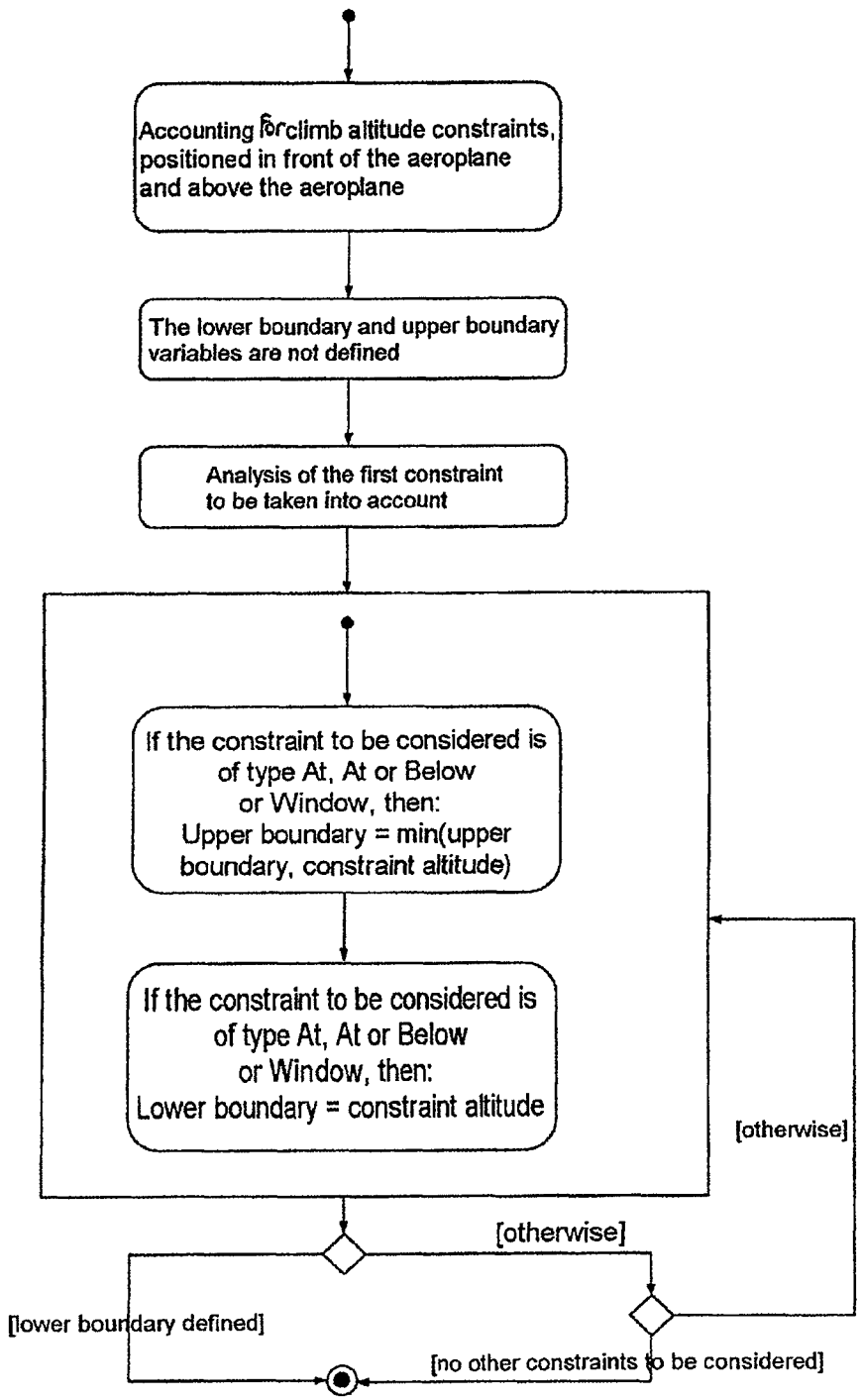
FIG. 9 represents the flow diagram of the calculations of the climb constraint filter for a vertical section according to an embodiment of the invention.
Figure 11:
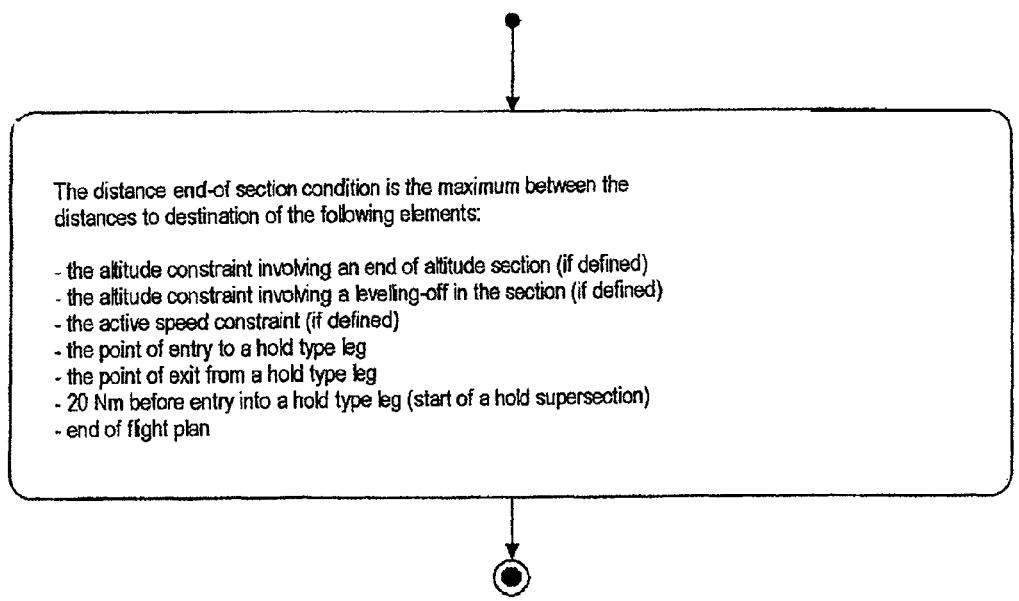
FIG. 11 represents the flow diagram of the calculations of the climbing minimum end distance for a vertical section according to an embodiment of the invention.

FIG. 5 represents the flow diagram of the calculations of the end conditions of a vertical section according to an embodiment of the invention. Four parameters are usually calculated to define the conditions at the limits of the section. A decision could be made to add or remove parameters. In the preferential mode of four conditions described here, one is defined in speed, two parameters are defined in altitude and one parameter is defined in distance:

the target speed and the target altitude are the speed and the altitude to be reached at the end of a section, given the constraints;

the characteristic altitude, the reaching of which determines the end of the current section, the calculation of which is performed by a filtering mode, one example of which is given as a comment to FIG. 9;

the minimum end distance, the reaching of which also determines the end of the current section; its calculation is performed by a processing operation, an example of which is given as a comment in FIG. 11.

Figure 6:
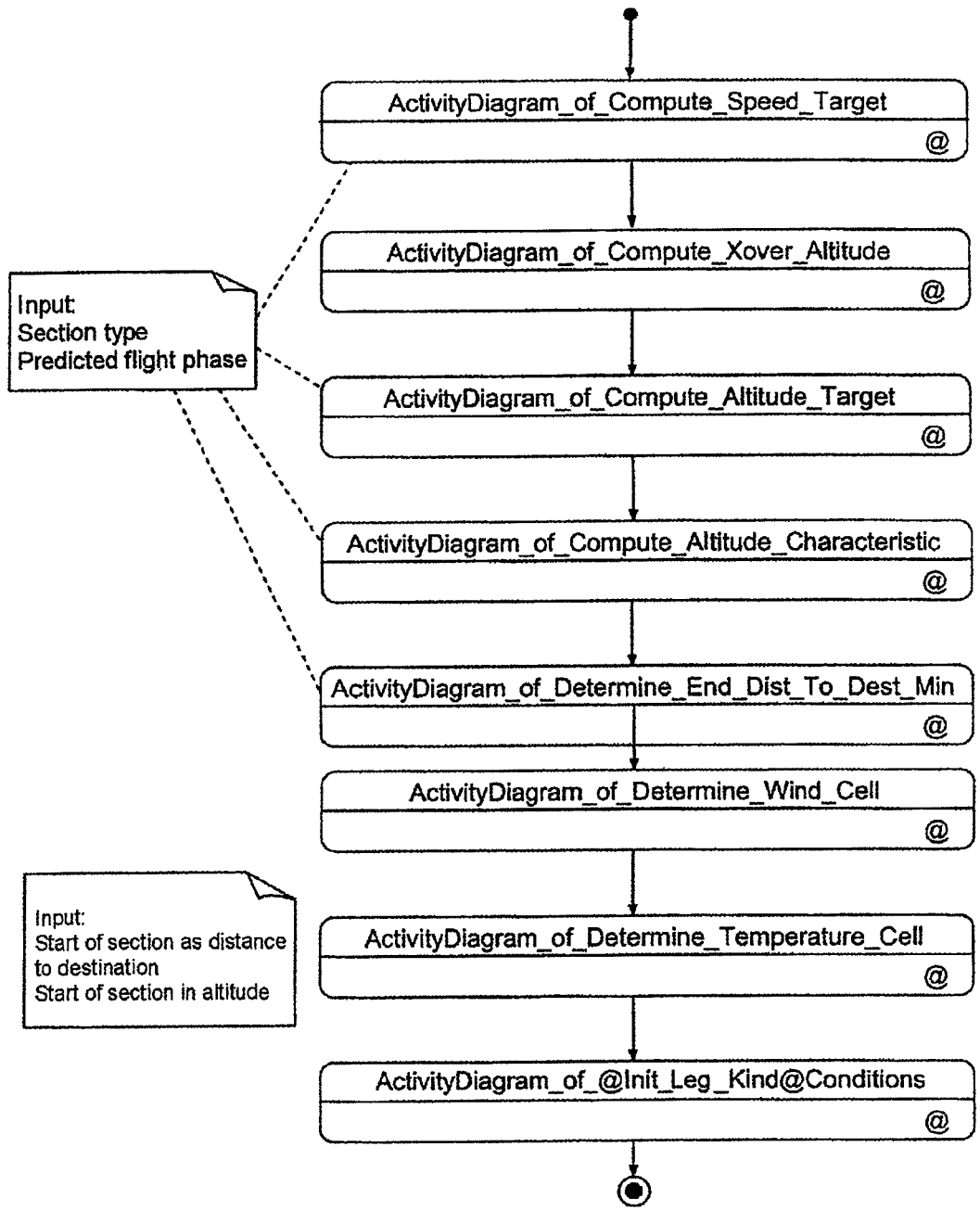
FIG. 6 represents the flow diagram of the calculations of the conditions applicable to a vertical section according to an embodiment of the invention.

FIG. 6 represents the flow diagram of the calculations of the conditions applicable to a vertical section according to an embodiment of the invention. The conditions that are calculated are:

calculation of the cross-over altitude (Xover_Altitude) which is defined as the altitude from which the speed of the aircraft is tracked in mach and no longer in CAS (calibrated air speed);

calculation of the wind cell applicable to the section characterized by a rectangle with wind values at each of the 4 corners of this rectangle;

calculation of the temperature cell applicable to the section characterized by a rectangle with temperature values at each of the 4 corners of this rectangle.

The wind and temperature cells are determined from the parameters obtained from the Weather module 160 which interfaces with the onboard sensors or which receives the data sent by air traffic control. Furthermore, the section determines the type of leg to be called before initiating the appropriate leg calculation (set level, max climb/descent, imposed vertical speed, imposed climb/descent angle, all these while in acceleration/deceleration or being at constant speed). A leg is a set of steps of the same type. For calculation accuracy issues, a step has a given maximum size so there may be several steps to form the desired leg.

Figure 7:
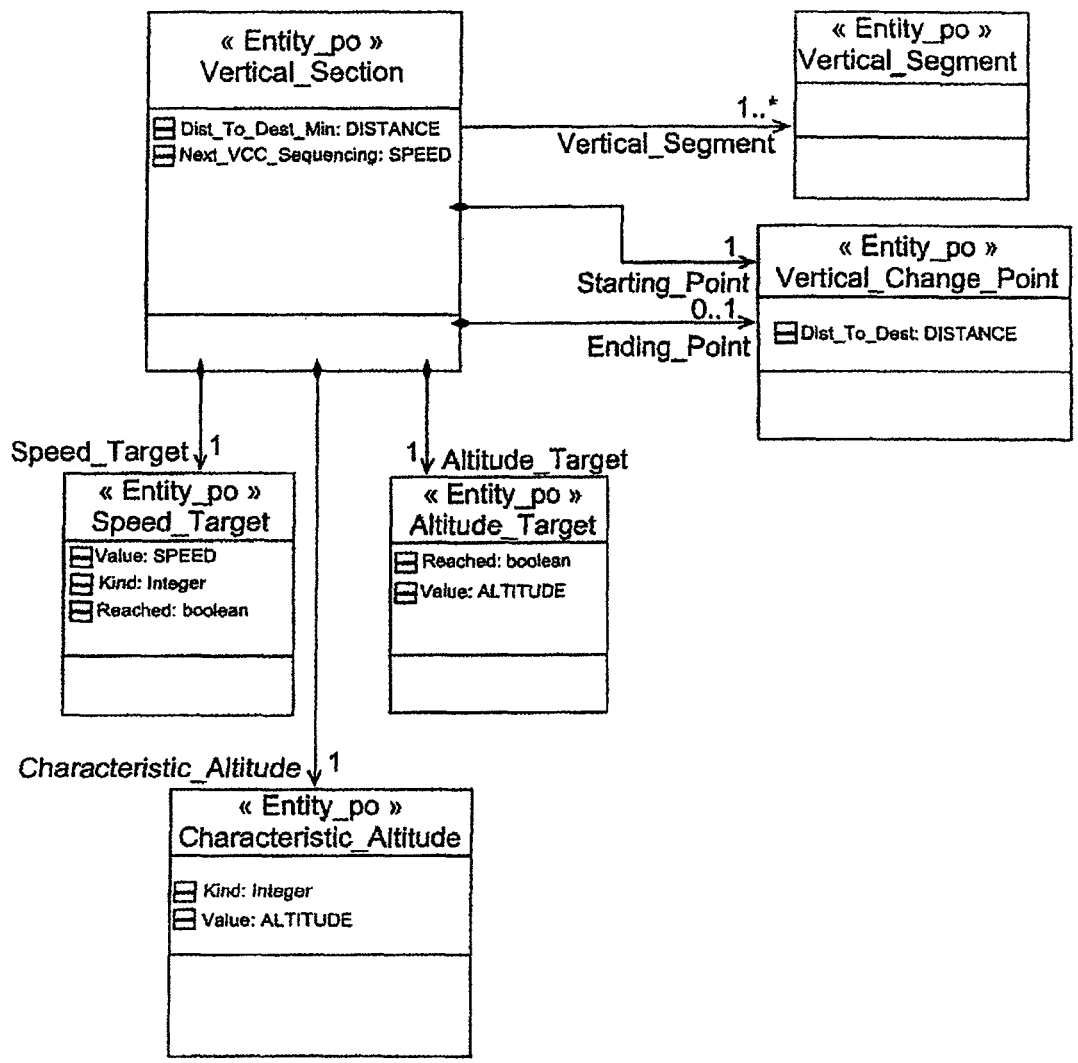
FIG. 7 represents the diagram of the tasks in processing a vertical section of a first type according to an embodiment of the invention.

FIG. 7 represents the diagram of the tasks in processing a vertical section of a first type according to an embodiment of the invention. The logic of the invention makes it possible to define several main types of sections and, within one of the main types, several secondary types. In a preferred embodiment, two main types are defined: a first type qualified as "normal" and a second type qualified as "supersection" which has the particular feature that it in turn comprises several types of secondary sections. It is possible to define more than two main section types.

FIG. 7 represents the diagrams of the tasks relating to a "normal" main type of vertical section. In this example of a vertical acceleration section to reach a target speed, the section comprises two vertical legs:

a first acceleration leg to the target speed, Vertical_Segment;

a second leg at constant speed to the end of the section, Vertical_Change_Point, the end condition of which is the reaching of the horizontal end-of-section distance (Dist_To_Dest).

FIG. 7 also specifies the types of values that the characteristic variables of the section of this first type can take:

minimum distance to destination (Dist_To_Dest_Min) with which is associated an auxiliary variable Next_VCC_Sequencing (speed of change of aeronautical configuration (flaps, etc.) that has to take place in the takeoff/climb phases and in the approach phase); the minimum distance to destination cannot be exceeded without changing section;

target speed (Speed_Target), which is used to limit the speed variations in the section; this requires a calculation of predictions at constant speed from the moment when the aircraft reaches this speed in the current section; the target speed is a particular object since it comprises a certain number of parameters:
  a fixed speed value;
  a boolean variable to indicate whether this target speed is fixed or changing (useful, among other things, in cruising when the speed changes as the aeroplane gets lighter);
  boolean variables indicating whether speed restrictions must be applied to this target speed (for example, by the limit by VMAXENDURANCE in the HM legs);

target altitude (Altitude_Target), which is used to limit the altitude variations in the section; this requires a calculation of predictions by level at this target altitude from the moment when the aeroplane on this section reaches this altitude; this target altitude notably makes it possible to easily manage the altitude constraints of "at or below" type (see later, comments on FIG. 9);

characteristic altitude (Characteristic_Aaltitude); reaching the characteristic altitude determines the end of the current section.

Figure 8:
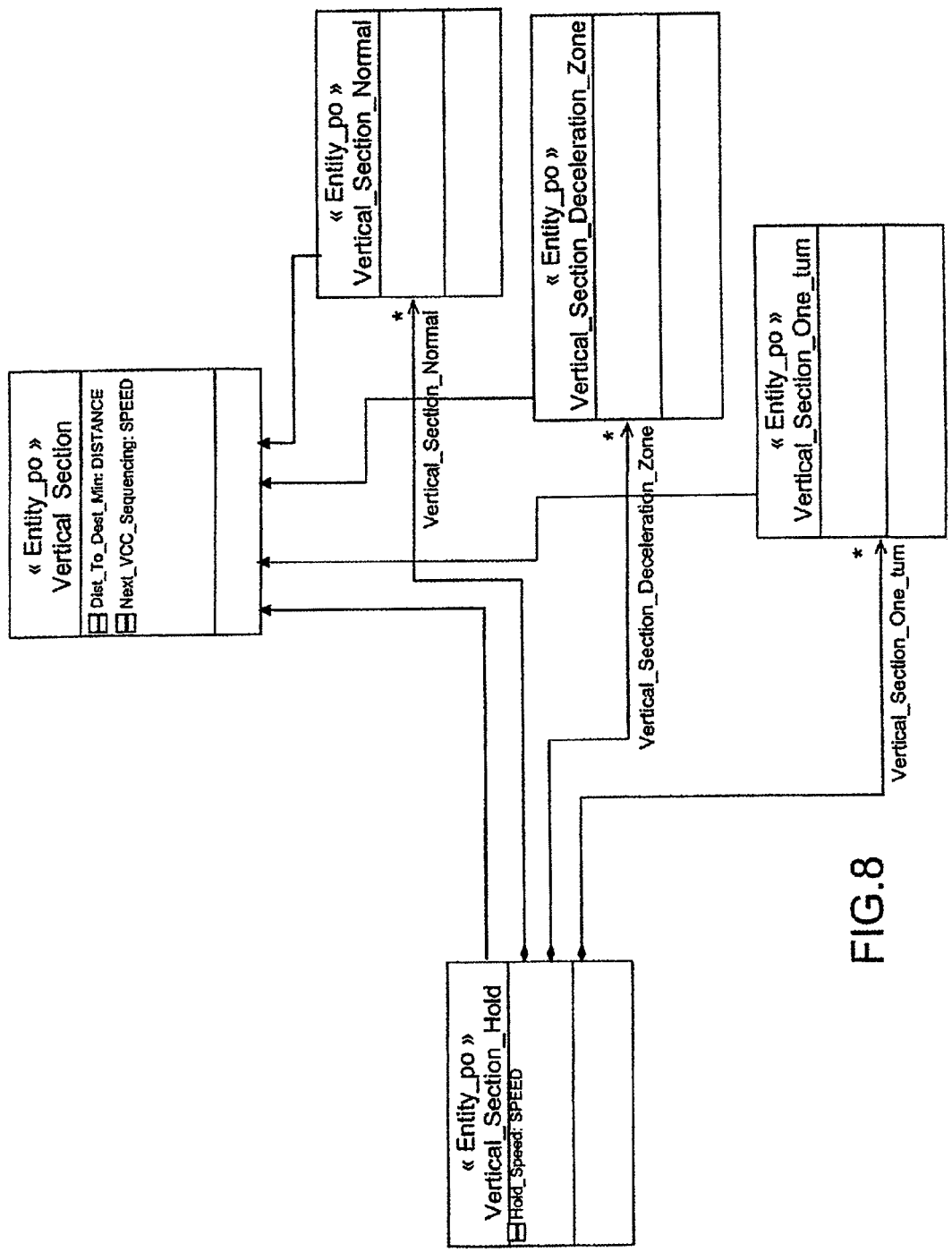
FIG. 8 represents the diagram of the tasks in processing a vertical section of a second type according to an embodiment of the invention.

FIG. 8 represents the diagram of the tasks in processing a vertical section of a second type according to an embodiment of the invention. To resolve the complexity associated with the predictions in a holding pattern, a second main type of sections has been defined, which makes it possible to call several secondary section types. In practice, certain constraints, notably speeds, apply in a holding pattern and the predictions must determine a deceleration point to re-enter the holding circuit with the right speed. Furthermore, it may be advantageous, so as not to increase the flight time by excessive proportions, to be able to define a minimum distance between the deceleration point and the entry into the HOLD, for example 20 NM, said maximum distance being defined by the aircraft manufacturer or the operator. The idea is therefore always to define the starting point of a "section with a hold", 20 NM in the case described, before entering the circuit and to make up the HOLD supersection with a succession of particular sections, namely:

normal sections before the deceleration point;

sections specific to the deceleration zone to the holding pattern's entry FIX;

sections specific to the circuit once having entered into the holding pattern.

This organization is applicable to other issues. For example, it is possible to define supersections that correspond to geo steps where it is necessary to program a deceleration prior to this descent when cruising. This supersection consists of deceleration sections to the imposed speed, and normal sections.

FIG. 9 represents the flow diagram of the calculations of the climb constraints filter for a vertical section according to an embodiment of the invention. This filter is adapted to process constraints of the following types:

"At" (Constraint_1) which defines a specific altitude that must be observed;

"At or below" (Constraint_2) which defines a ceiling altitude;

"At or above" (Constraint_3) which defines a floor altitude;

"Window" (Constraint_4) which defines a range between a floor altitude and a ceiling altitude.

The algorithm takes into account the following logical elements:

the constraints positioned in front of and above the aeroplane are taken into account in the order in which they occur;

two variables Lower_Boundary and Upper_Boundary are initialized but remain undefined;

two calculations are applied in succession:

IF Current_Constraint=((Constraint_1) OR (Constraint_2) OR (Constraint_4)), THEN
Upper_Boundary=MIN (Upper_$b$Bundary; Current_Altitude_Constraint)

IF Current_Constraint=((Constraint_1) OR (Constraint_3) OR (Constraint_4)), THEN
Lower_Boundary=Current_Altitude_Constraint.

The calculations are iterated until lower_boundary is defined, defining the boundary of the section or characteristic altitude. If all the constraints of the phase are used up before Lower_Boundary takes a defined value, the vertical section must be bounded in distance.

Figure 10:
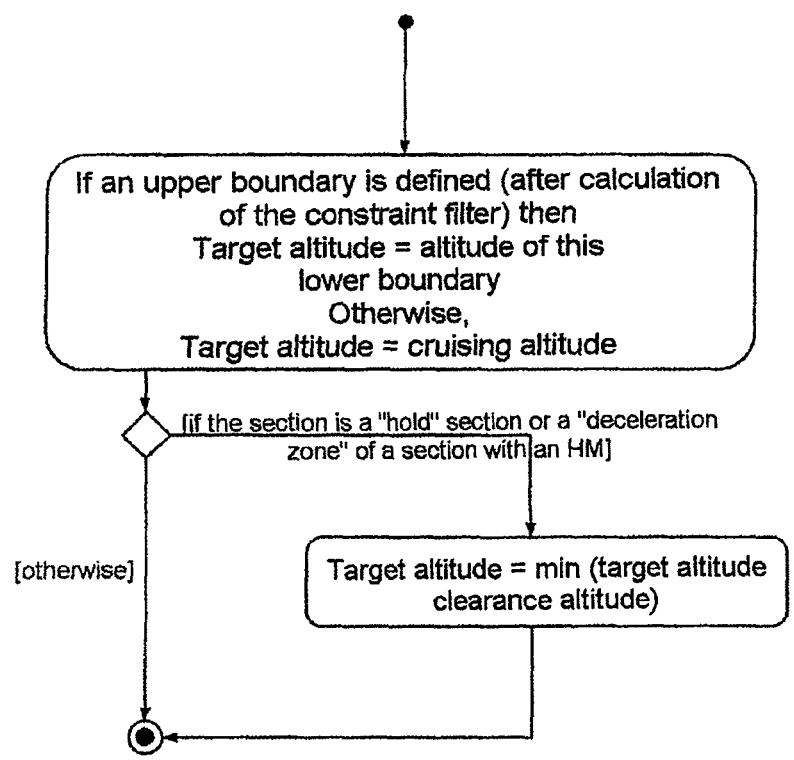
FIG. 10 represents the flow diagram of the calculations of the target altitude for a vertical section according to an embodiment of the invention.

FIG. 10 represents the flow diagram of the calculations of the target altitude for a vertical section according to an embodiment of the invention. In the preferred embodiment described here applied to a climb phase, the calculation of the target altitude is sequenced after that of lower_boundary and upper_boundary on leaving the algorithm for calculating the characteristic altitude. If upper_boundary is defined, then the target altitude is equal to upper_boundary. If upper_boundary is not defined, the target altitude is taken to be equal to the cruising altitude of the flight plan at the end of the climb phase, unless the section is a turn or a deceleration zone of an HM. In this case, the target altitude must be at least equal to the clearance altitude prescribed for the HOLD.

FIG. 11 represents the flow diagram of the calculations of the minimum end distance in a climb for a vertical section according to an embodiment of the invention.

The distance end condition of a section is useful in that it terminates a section when the conditions applicable to the section are no longer valid, which corresponds to a sequencing of a point that has an impact on said section. FIG. 11 explains the calculation of the end condition by distance of the climb and cruise sections. The minimum end distance is the maximum between the distances to destination resulting from the application of the following constraints (if they are defined):

an altitude constraint involving an end of section;
an altitude constraint involving a levelling-off in the section;
a speed constraint;
an entry point into a hold-type leg;
an exit point from a hold-type leg;
a point situated 20 NM before entry into a hold-type leg;
the flight plan end distance.

Figure 12:
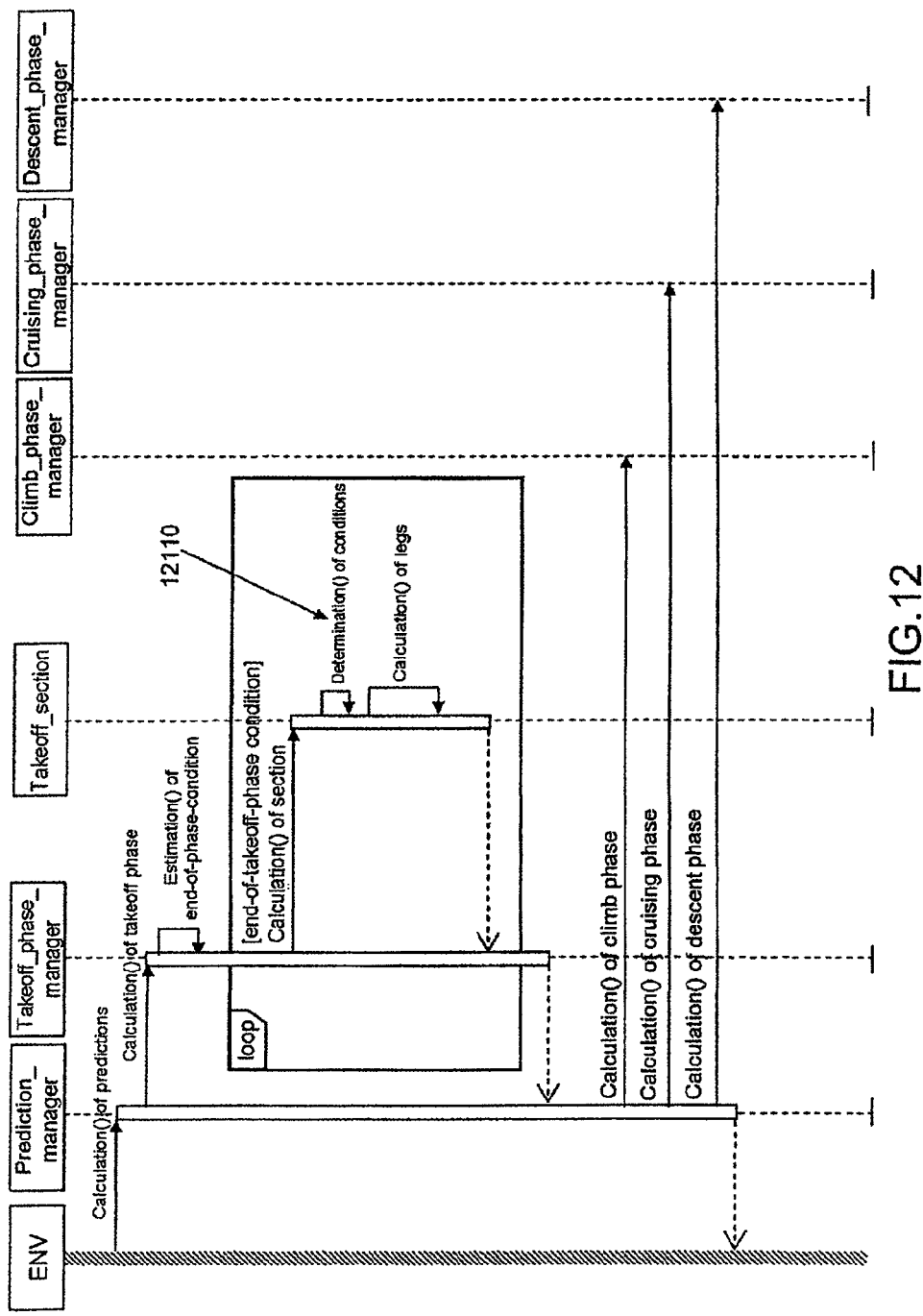
FIG. 12 represents a general flow diagram of the processing operations for an exemplary operational scenario of application of the invention in one of its embodiments.

FIG. 12 represents a general flow diagram of the processing operations for an exemplary operational scenario of application of the invention in one of its embodiments.

The arrangement of the processing operations performed by the various modules of FIG. 1 is explained in FIG. 12. It can in particular be seen that each functional prediction calculation level (overall, phase, section, leg) determines its own end conditions. The determination of the end conditions and other applicable conditions is illustrated in the case of a section belonging to a takeoff phase. The Determine( )Conditions function, 12110, makes the following assignments:

target speed=$V_2$+10KTS, where $V_2$ is the safe takeoff speed;
target altitude=cruising altitude, for reasons of robustness;
characteristic altitude=thrust reduction altitude if the aircraft is below this altitude, acceleration altitude otherwise; the acceleration altitude is the altitude at which the aircraft performs a horizontal acceleration after a first climb in altitude;
end distance=minimum between 20 NM before a hold and the flight plan end distance.

The invention can be implemented in a hardware architecture of the prior art comprising a set of flight computers organized for example in an integrated modular architecture (IMA) with the redundancies that are needed to ensure the certification of the aircraft. On the software level, the invention allows for an architecture in modular layers which can be specified and developed independently of one another. This architecture also facilitates the corrective and upgrade maintenance of the PRED module. The use of the sections also makes it possible to add in the future new functions that may be incorporated without any impact on the general prediction calculation architecture. In other words, simply by modifying the calculation of one of the parameters of the section, or, if the processing operation is more complex, creating a new type of supersection.

The examples described hereinabove are given as illustrations of embodiments of the invention. They in no way limit the scope of the invention which is defined by the following claims.

The invention claimed is:

1. A system for calculating, on-board an aircraft, flight predictions of the aircraft, the system comprising:
   a module, on-board the aircraft, configured to calculate predictions by flight phase;
   a module, on-board the aircraft, for calculating predictions by flight leg; and
   a module, on-board the aircraft, for calculating predictions by vertical section, a vertical section being contained in a flight phase and comprising at least one flight leg, said vertical section being defined by at least a calculation of at least a value of one flight parameter to be reached at the end of said vertical section, said calculation of predictions by vertical section being based on characteristics of at least one of a current flight leg and a current flight phase,
   wherein said predictions are based on actual flight parameters and not on modeled flight parameters.

2. The system for calculating flight predictions according to claim 1, wherein said one flight parameter is selected from a group comprising target speed, target altitude, characteristic altitude and minimum end distance.

3. The system for calculating flight predictions according to claim 2, wherein the target speed is a minimum of the values of a group comprising an active speed constraint, an optimum climb speed and, if a predicted altitude of the aircraft is less than an altitude corresponding to a climb limit speed, said climb limit speed, said target speed being less than a prescribed limit speed if the vertical section is a holding pattern or a deceleration zone.

4. The system for calculating flight predictions according to claim 2, wherein at least some limit conditions of a vertical section of a climb phase are defined, if there is an altitude constraint of the type value equal to, value less than or range of values, by an upper altitude boundary equal to a minimum of said upper boundary and of said altitude constraint, and if there is an altitude constraint of the type value equal to, value greater than or range of values, by a lower boundary equal to said altitude constraint.

5. The system for calculating flight predictions according to claim 4, wherein, if the vertical section is neither a holding pattern nor a deceleration zone of a vertical section comprising a leg HM, if an upper altitude boundary is defined, then the target altitude is the lower boundary, otherwise the target altitude is a cruising altitude.

6. The system for calculating flight predictions according to claim 4, wherein if the vertical section is a holding turn or a deceleration zone of a vertical section comprising a leg HM, if an upper boundary is defined, then the target altitude is said upper boundary, otherwise the target altitude is a cruising altitude, under a constraint that said target altitude must be higher than a prescribed minimum altitude.

7. The system for calculating flight predictions according to claim 1, wherein the module for calculating predictions by the vertical section also calculates conditions applicable to said vertical section chosen from a group comprising a crossover altitude, a minimum distance to destination at the end of the vertical section, a wind cell and a temperature cell.

8. The system for calculating flight predictions according to claim 1, wherein the module for calculating predictions by the flight phase calculates a type for a next vertical section.

9. The system for calculating flight predictions according to claim 8, wherein a type of vertical section applicable to a hold can be broken down into at least two sections, one a deceleration zone and another a holding pattern.

10. A method of calculating, on-board an aircraft, flight predictions of the aircraft, the method comprising:
- calculating, on-board the aircraft, predictions by flight phase;
- calculating, on-board the aircraft, predictions by flight leg; and
- calculating, on-board the aircraft, predictions by vertical section, a vertical section being contained in a flight phase and comprising at least one flight leg, said vertical section being defined by at least a calculation of at least a value of one flight parameter to be reached at the end of said vertical section, said calculation of predictions by vertical section being based on characteristics of at least one of a current flight leg and a current flight phase,
- wherein said predictions are based on actual flight parameters and not on modeled flight parameters.

* * * * *